D. R. Bowker & W. P. Bensel.

3 Sheets. Sheet 1.

Chiming Staves.

No. 14,74.

Reissued May 19. 1863.

Witnesses.

J. W. Coombs

Wm. Tusch

Inventors

D. R. Bowker W. P. Bensel per Munn & Co attorneys.

D. R. Bowker & W. P. Bensel. 3 Sheets. Sheet 2.

Chiming Staves.

No 1474. Reissued May 19. 1863.

Witnesses:

J. W. Coombs
Wm. Zusch

Inventors:

D. R. Bowker
W. P. Bensel
per Munn & Co attorneys.

D. R. Bowker & W. P. Bensel.
3 Sheets.
Sheet 3.
Chiming Staves.
No 1474.
Fig. 3. Reissued May 19. 1863.
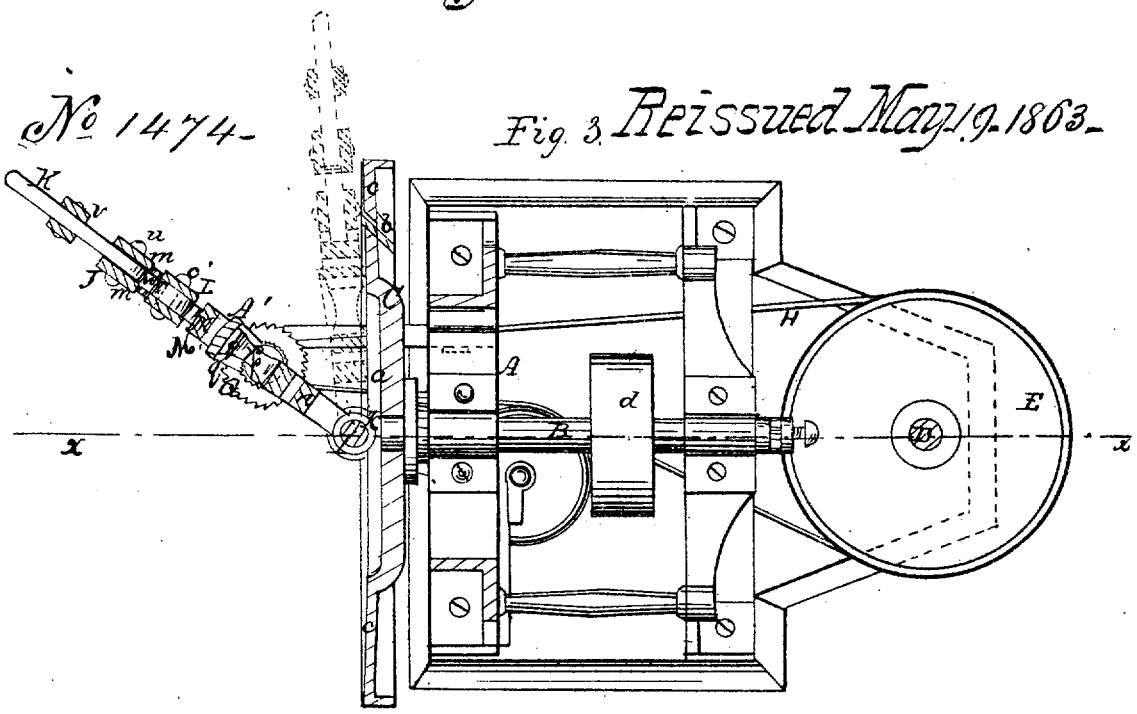
Fig. 4.
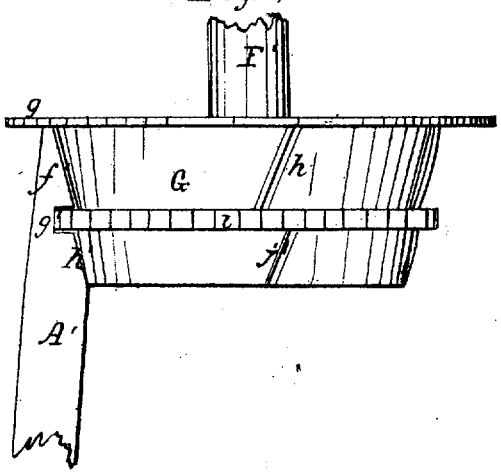
Witnesses
J. W. Coombs
Wm Tusch
Inventors.
D. R. Bowker. W. P. Bensel
per Munn & Co attorneys.

UNITED STATES PATENT OFFICE.

DANIEL R. BOWKER AND WILLIAM P. BENSEL, OF NEW YORK, N. Y.

MACHINE FOR CHINING AND JOINTING STAVES.

Specification forming part of Letters Patent No. 364, dated February 12, 1861; Reissue No. 1,474, dated May 19, 1863.

*To all whom it may concern:*

Be it known that we, DANIEL R. BOWKER and WILLIAM P. BENSEL, of the city, county, and State of New York, have invented a new and Improved Machine for Chining and Jointing Staves for the Manufacture of Barrels and all Kinds of Casks; and we do hereby declare that the following is a full, clear, and exact description of the same, reference being had to the annexed drawings, making a part of this specification, in which—

Figure 1:
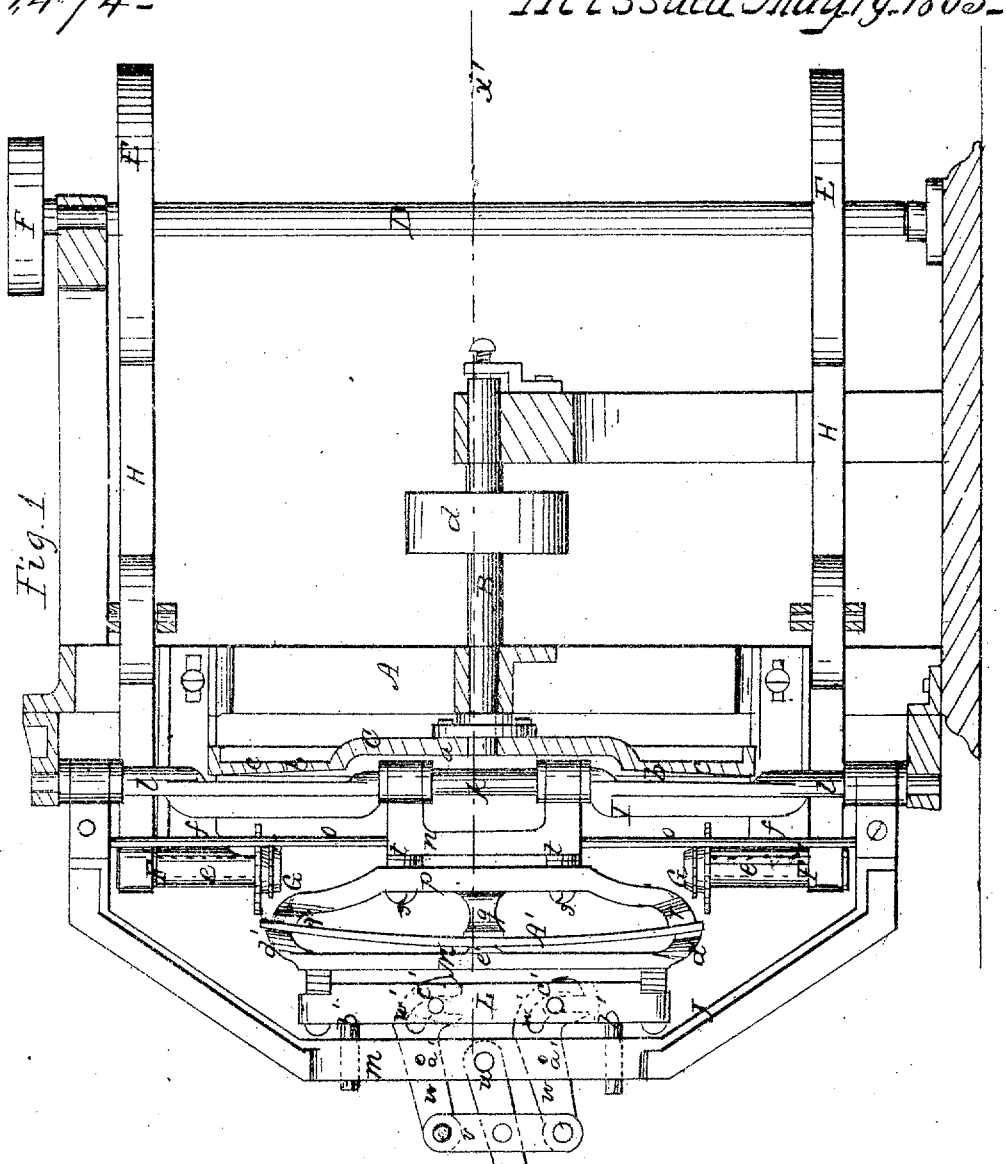
Figure 2:
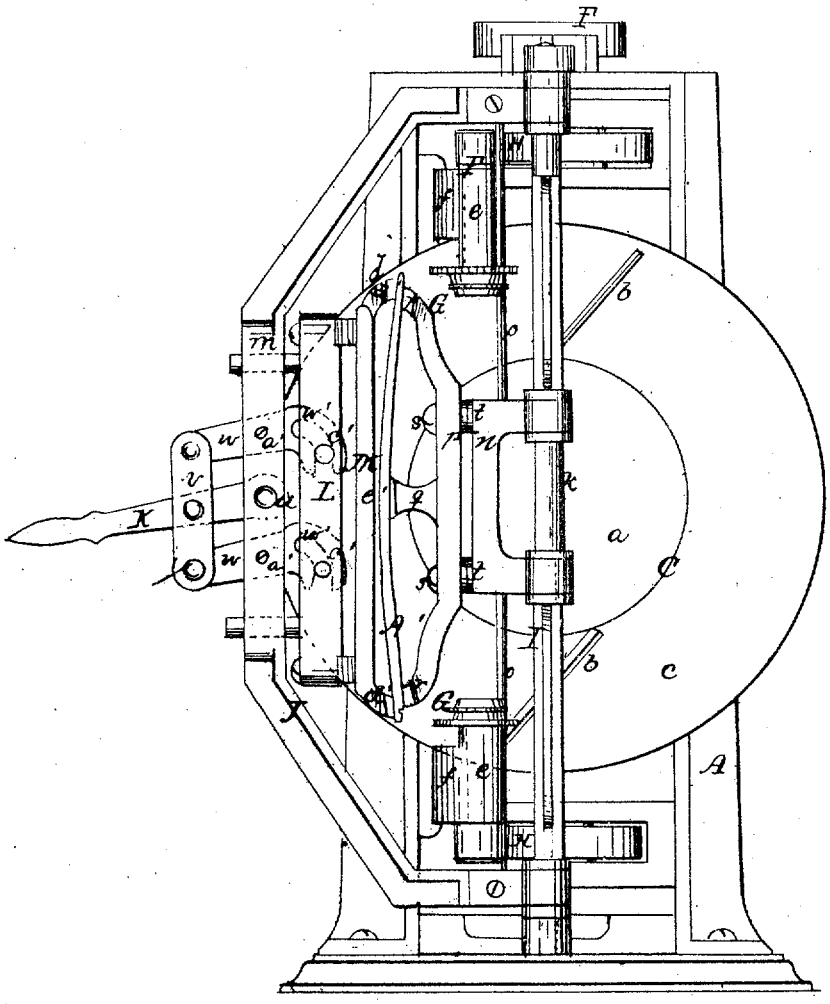

Figure 1 is a side sectional view of our invention, taken in the line *x x*, Fig. 3; Fig. 2, a front view of the same; Fig. 3, a horizontal section of the same, taken in the line *x′ x′*, Fig. 1; Fig. 4, a detached view of the cutter of the same.

Similar letters of reference indicate corresponding parts in the several figures.

The object of this invention is to obtain a simple machine for chining staves—that is to say, cutting the chamfer, croze, and howel—and also for jointing the staves, the work being done at one operation.

The invention consists in the employment or use of a rotary cutter-disk in connection with a swinging clamp-frame and rotary cutters arranged for joint operation, substantially as hereinafter described, whereby the desired object is obtained.

To enable those skilled in the art to fully understand and construct our invention, we will proceed to describe it.

A represents a framing, which may be constructed in any proper way, to support the working parts of the machine; and B is a horizontal shaft, which is placed in said framing A, and has a cutter-disk, C, attached at one end. This disk has a circular recess, *a*, at its center, the cutters *b b* of the disk being secured in the outer part, *c*, of the disk, and in an oblique position therein, as shown clearly in Fig. 2. On the shaft B a driving-pulley, *d*, is placed.

D is a vertical shaft, which is also placed in the framing A, and has a pulley, E E, on it, one near each end, and a driving-pulley, F, at its upper end.

F′ F′ are two small vertical arbors, which are fitted in proper heads, *e e*, at the ends of horizontal arms *f f*, which are attached, one to the upper and the other to the lower part of the framing. At the lower end of the upper arbor F′ and the upper end of the lower arbor F′ there are secured cutter-heads G. These cutter-heads have attached to them a circular saw, *g*, and cutters *h i j*, as shown in Fig. 4. The arbors F′ F′ are rotated from the shaft D by belts H H, as shown clearly in Figs. 1 and 2.

I is a vertical stationary shaft, which is secured to the framing A directly in front of the cutter-disk C and in line with its axis or shaft B. The shaft I is not perfectly straight, it being so bent that its central part, *k*, may project into the recess *a* at the center of the cutter-disk C, and its ends *l l* be in line with the central part, *k*. This will be fully understood by referring to Fig. 1.

On the shaft I there is placed a swinging frame, J. This frame may be described as being formed of two parts, *m n*. The part *m* is a curved or bent bar, the ends of which are fitted loosely on the ends *l l* of the shaft I and allowed to swing freely thereon. The other part, *n*, of the frame J is fitted on the central part, *k*, of the shaft I, and is allowed to swing or turn freely thereon. The two parts *m n* of the frame J are connected by rods or bars *o o*, which insure a simultaneous movement or turning of said parts and a proper relative position of the same at all times. (See Figs. 1 and 2.)

To the smaller part *n* of the frame J there is attached a curved bar, *p*, which is provided with a horizontal central projection, *g*, which, with the two ends *r r* of the bar *p*, form bearing-points for the stave to be operated upon. This bar *p* is attached to the part *n* of the frame J by screws *s s*, and india-rubber or other suitable elastic washers, *t*, are interposed between the bar *p* and part *n*, the use of which will be presently shown.

To the part *m* of the frame J there is attached by a fulcrum-pin, *u*, a lever, K. This lever K has a bar, *v*, secured to it, to the ends of which there are attached the outer parts of levers *w w*, which are also secured by fulcrum-pins *a′ a′* in the part *m* of the frame J. The inner parts of the levers *w* have each a curved slot, *w′*, in them, and they are fitted in slots in a bar, L, which is attached to guides *b′ b′*, which work horizontally in the part *m*. Pins *c′* in the bar L pass through the slots *w′* of the levers *w*. (See Figs. 1 and 2.)

To the bar L a bar, M, is attached by proper bolts or screws, and the ends of the bar M project outward, as shown at *d'*, to form bearing-points for the staves, a central bearing-point, *e'*, being also attached to said bar M.

The operation is as follows: The stave A' to be operated upon, being properly dressed, is clamped between the two bars *p* M by forcing down the lever K, the stave when thus clamped being properly bent or curved by the relative position of the bearing-points *q r r d' d' e'* of the bars *p* M. The elastic washers *t* compensate for the difference in the thickness of the staves, and insure all being securely held in proper position. The shafts B I are rotated by any convenient power, and the frame J is turned in a direction toward the left, and the saws *q* of the cutter-heads G saw off the ends of the staves so that the latter will be of proper length, while the cutters *h* form the chambers *f*, the cutters I cut the croze *g'*, and the cutters *j* form the howel *h'*. (Shown in Fig. 4.) The frame J being still turned further to the left will bring one edge of the stave in contact with the part *c* of the disk C, and the cutters *b* will joint the edge of the stave. The frame J is then turned in the opposite direction—to the right—until the opposite edge of the stave is brought in contact with the part *c*, and the remaining edge of the stave is jointed and the operation ended. It will be seen that the staves are jointed perfectly on a radius with the disk C in consequence of the frame J being hung on a bent shaft, I. This arrangement of the shaft I causes the frame J to swing from the center of disk C, or rather from a line which passes through its center, and this line corresponds with the center of the barrel or case of which the stave is to form a part. This is an important feature of the invention, as it insures a perfect jointing of the staves. By having the parts *m n* of the frame J connected together they are made to move or turn simultaneously, and the bars *p* M of the clamp are always kept in a proper relative position with each other for the ready insertion of the stave.

We do not claim the cutter-heads G, for they have been previously used, nor do we claim the clamp for clamping the staves, for substantially the same thing has been used; but We do claim as new and desire to secure by Letters Patent—

1. The swinging clamp-frame J, in combination with the rotating cutter-disk C, arranged substantially as shown, for the purpose of jointing the staves, as set forth.

2. The combination of the rotating cutter-disk C with the cutter-heads G G and swinging clamp-frame J, arranged for joint operation substantially as and for the purpose set forth.

DANL. R. BOWKER.
WM. P. BENSEL.

Witnesses:
M. S. PARTRIDGE,
ROBT. LOUDER.